US 6,668,886 B1

(12) United States Patent
Iwamura

(10) Patent No.: US 6,668,886 B1
(45) Date of Patent: Dec. 30, 2003

(54) VEHICLE TIRE HAVING SIPES

(75) Inventor: Wako Iwamura, Kobe (JP)

(73) Assignee: Sumitomo Rubber Industries, Ltd., Kyogo-ken (JP)

( * ) Notice: Subject to any disclaimer, the term of this patent is extended or adjusted under 35 U.S.C. 154(b) by 0 days.

(21) Appl. No.: 09/505,892

(22) Filed: Feb. 17, 2000

(30) Foreign Application Priority Data

Feb. 18, 1999 (JP) ................................................ 11-40344

(51) Int. Cl.[7] .............................................. B60C 11/12
(52) U.S. Cl. ........................ 152/209.18; 152/209.23; 152/902; 152/DIG. 3
(58) Field of Search ................... 152/209.18, 209.19, 152/209.23, DIG. 3, 902

(56) References Cited

U.S. PATENT DOCUMENTS

| | | | | |
|---|---|---|---|---|
| 4,566,514 A | * | 1/1986 | Mauk et al. | 152/209.23 |
| 4,994,126 A | * | 2/1991 | Lagnier | 152/DIG. 3 |
| 5,095,963 A | * | 3/1992 | Maitre | 152/DIG. 3 |
| 5,316,063 A | * | 5/1994 | Lagnier | 152/DIG. 3 |
| 5,350,001 A | * | 9/1994 | Beckmann et al. | 152/DIG. 3 |

FOREIGN PATENT DOCUMENTS

| | | |
|---|---|---|
| EP | 450251 A1 | 10/1991 |
| JP | 9-193619 | * 7/1997 |
| JP | 9-272312 | 10/1997 |
| JP | 9-277805 | * 10/1997 |
| JP | 10-80923 | * 3/1998 |
| JP | 10-315715 | * 12/1998 |

OTHER PUBLICATIONS

Machine Translation for Japan 9–272312.*

* cited by examiner

Primary Examiner—Steven D. Maki
(74) Attorney, Agent, or Firm—Birch, Stewart, Kolasch & Birch, LLP

(57) ABSTRACT

A vehicle tire is provided in the tread portion with sipes capable of improving the rigidity of tread rubber, wherein each of the sipes comprises an radially outer part and radially inner parts, the radially outer part extends radially inwards from the tread face to a certain depth H and extends continuously in the longitudinal direction thereof, the radially inner parts extend radially inwards from the radially inner end of the radially outer part, the radially inner parts comprises at least one first inner part inclined towards one side of the radially outer part and at least two second inner parts inclined towards the other side of the radially outer part, and the first and second inner parts alternate with each other in the longitudinal direction of the sipe.

15 Claims, 5 Drawing Sheets

VEHICLE TIRE HAVING SIPES

The present invention relates to a vehicle tire having improved sipes capable of improving the rigidity of tread rubber.

In order to improve running performance on snowy and icy roads, cuts or narrow slits so called sipes are formed in the tread portion. Such sipes provide edged corners in the tread face and thus grip performance is improved correspondingly. Accordingly, as the number of the sipes increases, the performance on snowy and icy roads may be improved, but the rigidity of the tread portion inevitably decreases. Therefore, if the number or density of the sipes is increased beyond some value, the performance lowers by contraries. Thus, it is difficult to improve on-the-snow-and-ice performances by increasing the number of the sipes.

It is therefore an object of the present invention to provide a vehicle tire in which on-the-snow-and-ice performances are improved by increasing the number of sipes without suffering from a decrease in the tread rigidity.

According to the present invention, a vehicle tire comprises a tread portion and sipes disposed therein, each of the sipes comprising an radially outer part and radially inner parts, the radially outer part, extending radially inwards from the tread face to a certain depth H, and extending continuously in the longitudinal direction of the sipe, the radially inner parts extending radially inwards from the radially inner end of the radially outer part at the above-mentioned depth H, the radially inner parts comprising at least one first inner part inclined towards one side of the radially outer part and at least two second inner parts inclined towards the other side of the radially outer part, the first and second inner parts alternating with each other in the longitudinal direction of the sipe.

Embodiments of the present invention will now be described in detail in conjunction with the accompanying drawings.

Figure 1:
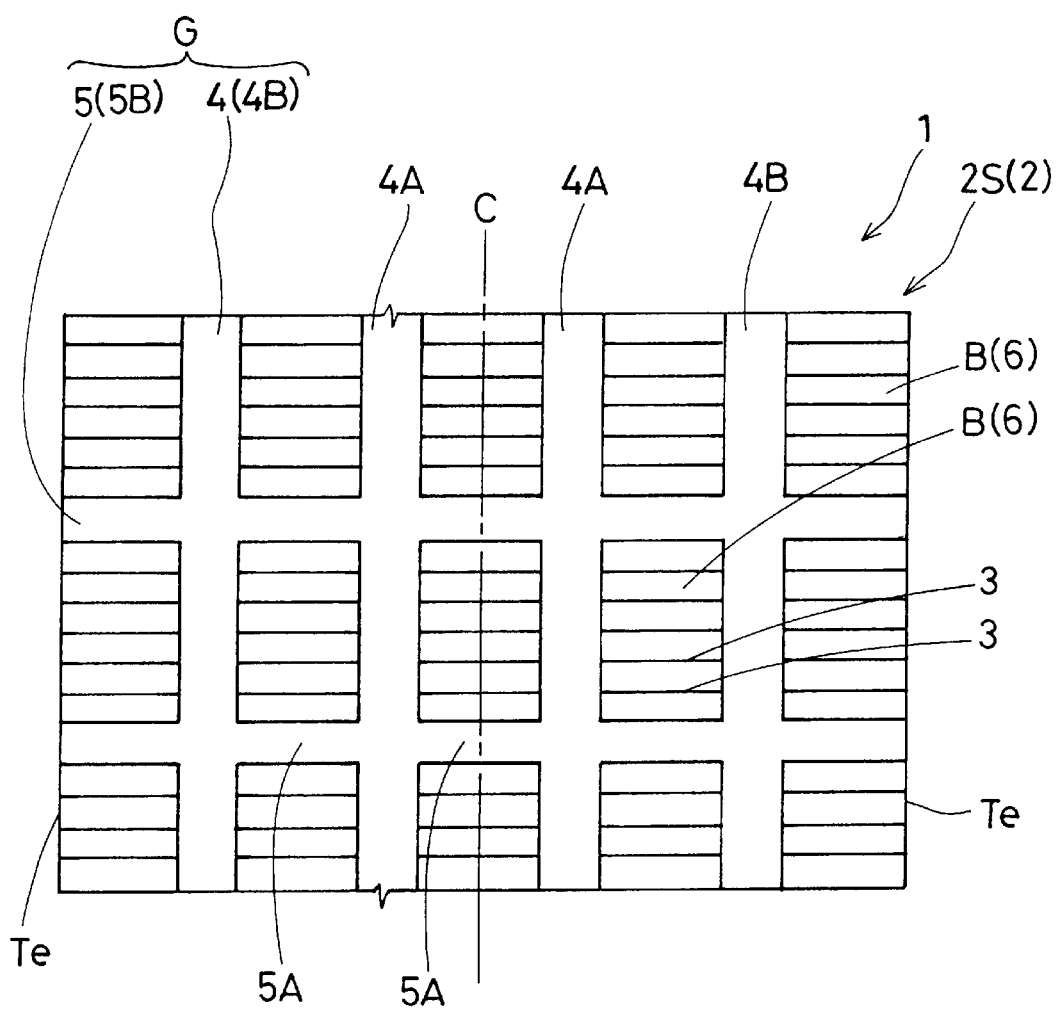
FIG. 1 shows a tread pattern of a tire according to the present invention.

Vehicle tire 1 according to the present invention is provided in the tread portion 2 with tread elements 6, such as blocks B, ribs and the like, provided with sipes 3. The tread elements 6 are separated by tread grooves G. The sipe 3 is defined as a narrow slot or cut having a width W1 in the range of from 0.5 to 2.0 mm. The tread groove G is defined as having a width more than 2 mm.

In this embodiment, the vehicle tire 1 is a studless pneumatic tire for passenger cars. Therefore, the tire 1 has the above-mentioned tread portion 2, a pair of axially spaced bead portions and a pair of sidewall portions extending therebetween, and is reinforced with a carcass ply, tread belt, bead core and the like.

In FIG. 1 showing an example of the tread pattern, the tread grooves G include a plurality of circumferential grooves 4 and a plurality of axial grooves 5. The circumferential grooves 4 are an axially inner groove 4A and axially outer groove 4B disposed on each side of the tire equator C. And the axial grooves 5 are axial grooves 5A extending between the circumferential grooves 4 and axial grooves 5B extending between the circumferential grooves 4 and tread edges Te. The tread portion 2 is divided into blocks B which constitute a block pattern. The circumferential grooves 4 and axial grooves 5 in this example are straight, but, various configurations such as zigzag and the like may be used. The axial grooves 5 disposed adjacent each other in the axial direction are substantially aligned. As a result, five rows of rectangular blocks are formed.

As to the widths and depths of the tread grooves G, preferably the widths are set in the range of from 3 to 25 mm and the depths are set in the range of from 6 to 12 mm in case of a passenger tire for example.

In FIG. 1, the axial grooves 5 are parallel to the tire axial direction to derive maximum grip. But it is also possible to incline the axial grooves 5 at a certain angle. If the axial grooves 5 are inclined at an angle of from 5 to 30 degrees with respect to the axial direction of the tire, discharging of snow from the grooves can be promoted.

According to the present invention, the sipes 3 include sipes extending in a direction crosswise to the circumferential direction of the tire and optionally sipes extending in the circumferential direction of the tire. Further, the tread portion 2 may include tread elements not provided with a sipe.

In this embodiment, each of the tread element 6 is provided with at least one sipe 3 extending crosswise to the circumferential direction of the tire.

Figure 2:
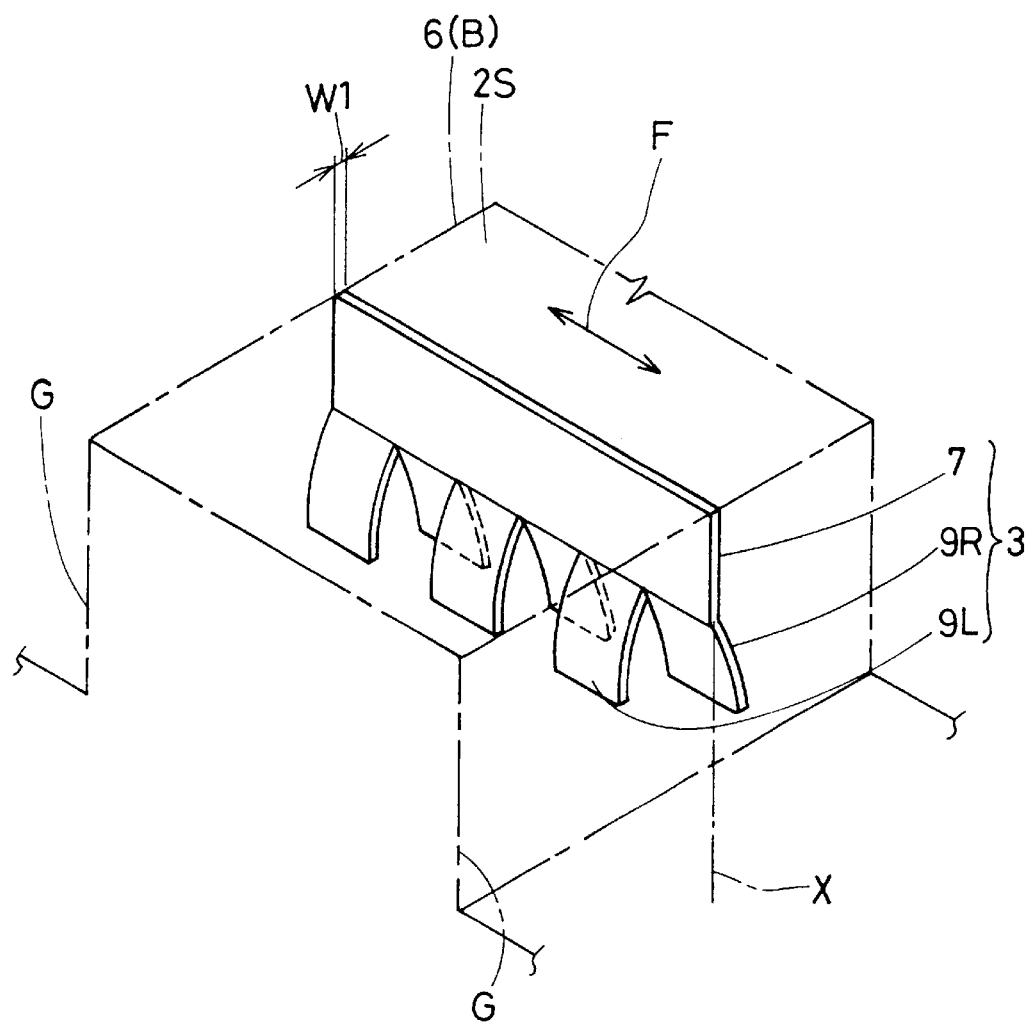
FIG. 2 is a perspective view of an example of the sipe.
Figure 3A:
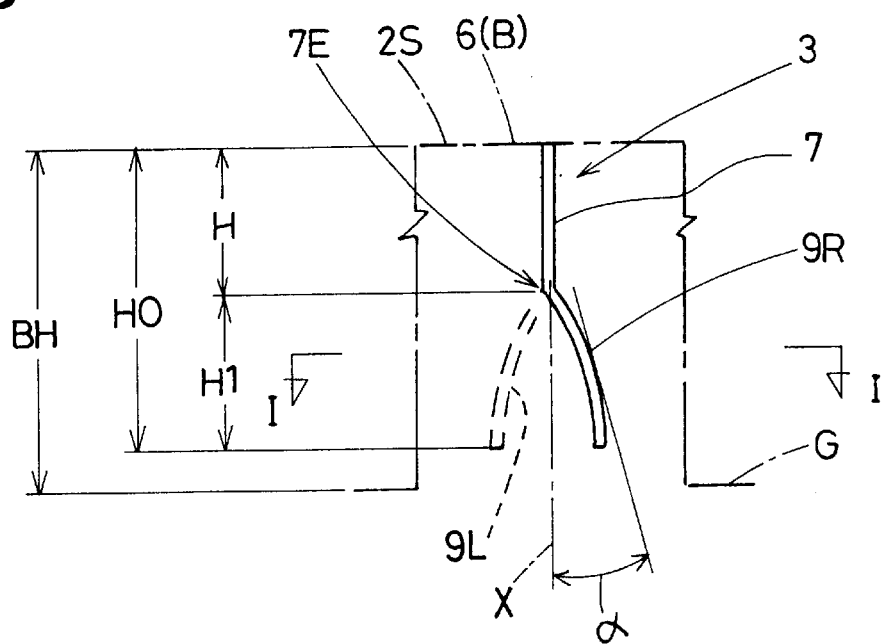
FIG. 3A is a cross sectional view taken along a direction normal to the longitudinal direction of the sipe.
Figure 3B:
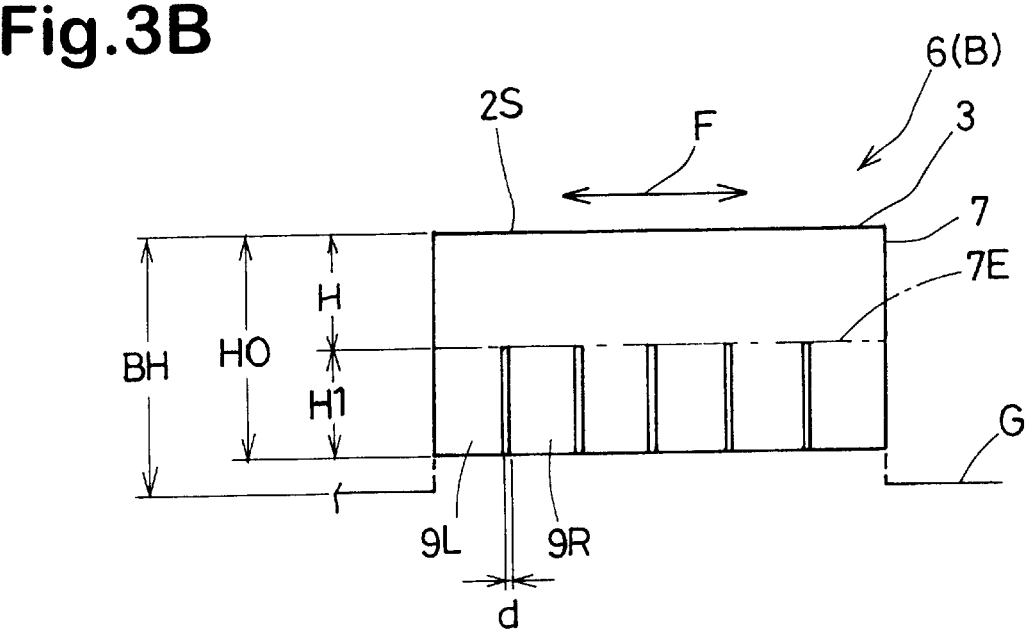
FIG. 3B is a side view of the sipe in the direction normal to the longitudinal direction of the sipe.

As shown in FIGS. 2 and 3A and 3B, each sipe 3 comprises an outer part 7 and inner parts 9, the inner parts 9 comprises first inner parts 9L and second inner parts 9R. The above-mentioned width W1 is substantially constant throughout the outer part 7 and inner parts 9.

The outer part 7 extends from the tread face 2S to a certain depth H, and in this range the outer part 7 is continuous in the longitudinal direction F of the sipe 3, and the ends in the longitudinal direction F open at the side face of the tread element 6. As shown in FIG. 3A, the outer part 7 intersects the tread face 2S at a substantially right angle and opens at the tread face 2S. In the example shown in the figures, the outer part 7 is straight in a plane parallel to the tread face 2S, but it is also possible to employ a curved configuration. In FIG. 1, the longitudinal direction F is equal to the axial direction of the tire, but it can be differed such that the angle between the longitudinal direction F and the tire axial direction becomes 5 to 30 degrees for example.

Figure 4:
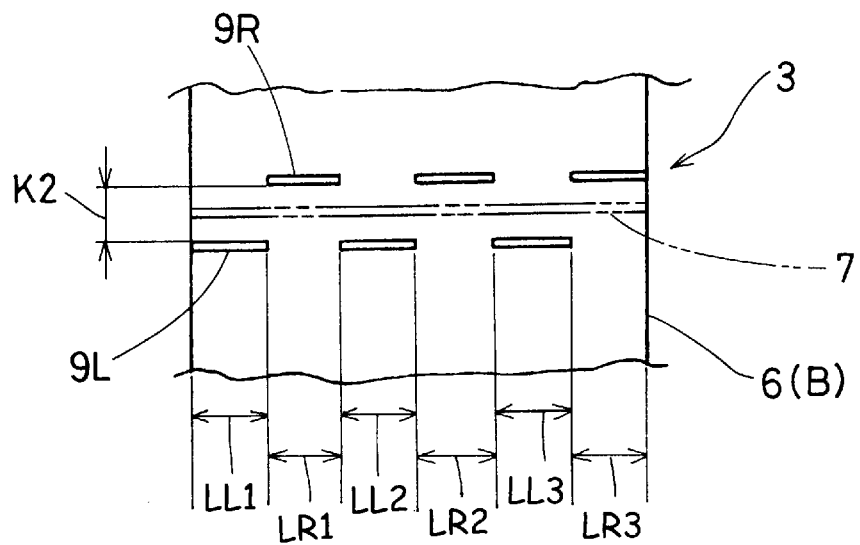
FIG. 4 is a cross sectional view taken along a line I—I of FIG. 3A.
Figure 6:
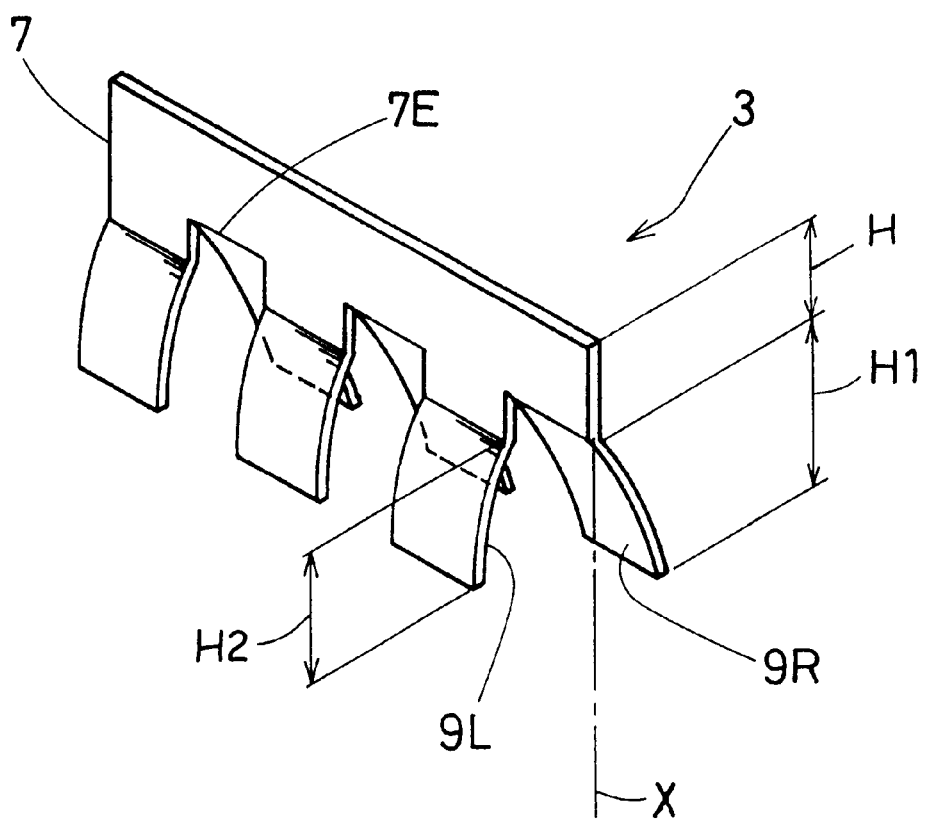
FIG. 6 is a perspective view of another example of the sipe.

As shown in FIG. 2 and FIG. 6, the first and second inner parts 9L and 9R extend radially inwards from the radially inner end 7E of the outer part 7, and are staggered. In other words, the first inner parts 9L and second inner parts 9R are disposed alternately with each other, and as best shown in FIG. 3A, the first inner parts 9L extend towards one side of a center line X (or center plane X) of the outer part 7 and the second inner parts 9R extend towards the other side of the center line X. Thus, in a range under the depth H. the sipe 3 is discontinuous in the longitudinal direction F. As shown in FIG. 4, the outermost inner parts 9L, 9R open at the side face of the tread element 3, but middle inner parts 9L, 9R are closed.

The radial height H1 of the inner part 9L, 9R is preferably set in the range of 0.2 to 0.8 times more preferably 0.35 to 0.65 times the depth H0 of the sipe 3. The depth H0 may be set in the range of from 0.4 to 1.0 times the height BH of the tread element 6.

As shown in FIG. 3A, gaps (d) between the first and second inner parts 9L and 9R in the longitudinal direction F are at most 2 mm, preferably substantially zero.

The inclination angle (alpha) of the inner part 9L, 9R with respect to the center line X may be set at a substantially constant value. But it is preferable that the inclination angle (alpha) gradually decreases radially inwards, and at the radially inner end (bottom), the inclination angle (alpha) is substantially 0 degrees.

As to the inclination and shape, the first inner parts 9L and the second inner parts 9R in this example are substantially symmetrical about the center plane X. Thus, the radially inner ends of the first inner parts 9L and the radially inner ends of the second inner parts 9R are disposed at the same depth.

The number of the inner parts 9L and 9R is at least three, usually and preferably set in the range of from three to six. In order that the first and second inner parts effectively maintain the rigidity of the tread element 6, the lengths LLn and LRn (n=suffix number) of the inner parts 9L and 9R, respectively, are determined so that the supporting force by the first inner parts 9L balances with the supporting force by the second inner parts 9R. That is, the total of the lengths LLn of the first inner parts 9L is set to be substantially equal to the lengths LRn of the second inner parts 9R in each sipe 3. If the number of the first inner parts 9L is equal to the number of the second inner parts 9R, the lengths LLn and LRn may be set at the substantially same value. If not, the length LLn is set differently from the length LRn. For example, if the total number of the inner parts 9L and 9R is three, one inner part having a length L is disposed between two inner parts each having 50% of the length L. Therefor, the rigidity becomes uniform, and deformation, e.g. torsional deformation and the like can be reduced.

FIG. 6 shows another example of the sipe in which the first inner parts 9L are formed in a different shape from the second inner parts 9R. In this example, from the inner end 7E of the outer part 7 at the depth H, the second inner parts 9R are inclined towards one side of the center plane X, but the first inner parts 9L are extended parallel with the center plane X for a short distance and then inclined towards the other side of the center plane X. It is preferable in this example too, that the inclination angle (alpha) gradually decreases radially inwards and the angle becomes substantially 0 degrees at the bottom. The radial height H2 of the inclined part of the first inner part 9L and the radial height H1 of the inclined second inner part 9R are preferably set in the range of 0.2 to 0.8 times more preferably 0.35 to 0.65 times the depth H0 of the sipe 3.

When the sipes 3 are arranged adjacently to each other in a direction normal to the longitudinal direction F of the sipes, the sipes 3 may be arranged by parallel translation or displacement in the normal direction in order to prevent the inner parts of each sipe from interfering with those of the adjacent sipe. As a result, the spacing P between the sipes 3 in the normal direction can be decreased to 8.0 mm or less. Usually, the spacing P can be decreased to 4.0 mm or less without any difficulty. However, it is difficult to set the spacings P in the range of less than 2.0 mm. Therefore, when the sipes are formed adjacently to each other as above, the spacings P are set in the range of not more than 8.0 mm, preferably not more than 4.0 mm, but not less than 2.0 mm.

In the present invention, it is possible to employ the first inner parts having different shapes and/or the second inner parts having different shapes. Further, the sipe 3 can be formed such that 1) one end thereof opens at the side face of the tread element 6, but the other end is closed, 2) both the ends are closed. As the tread pattern, it may be possible to employ a block pattern composed of blocks only, a rib pattern composed of a plurality of circumferentially extending ribs, a block-rib pattern composed of blocks and at least one circumferentially extending rib, and the like.

Figure 5:
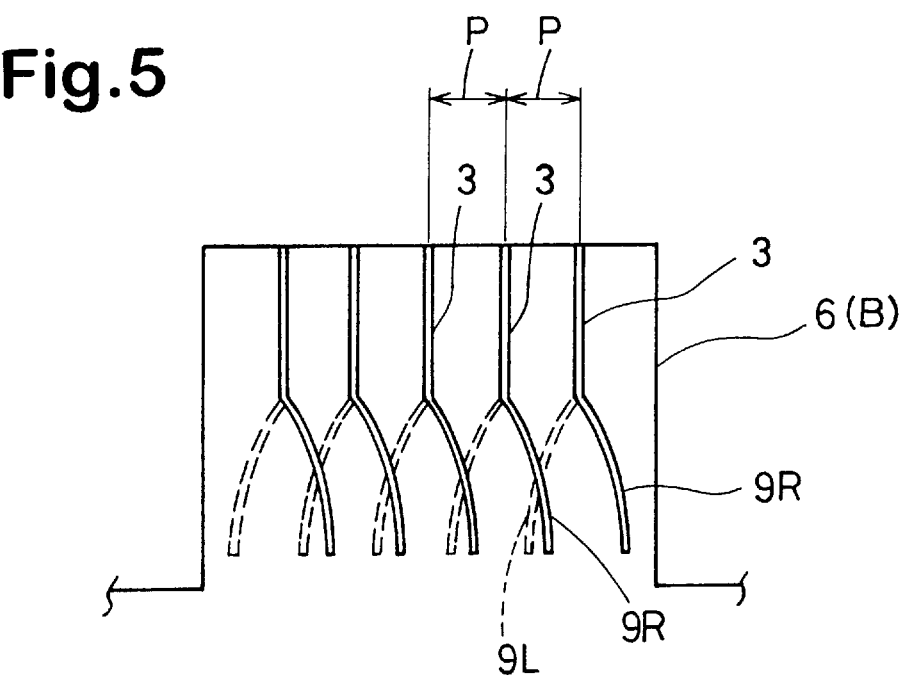
FIG. 5 is a cross sectional view of a block showing an arrangement of sipes.

As the sipes 3 are constructed as above, part of tread rubber facing the inner parts 9 behave like a rubber block already inclined (see FIG. 5 which shows the first inner parts of one of the sipes overlapping the second inner parts of an adjacent sipe when viewing a cross-section of the tread portion). Therefore, if the tread element is subjected to a tangential force in the same direction as the inclining direction, an additional inclination is reduced. Further, the parts which seem to be already inclined are connected with each other in the longitudinal direction F (see FIG. 4) Therefore, a part of the tread element under the outer parts 7 is increased in the rigidity. On the other hand, as the height H of the outer parts 7 is relatively decreased, a part of the tread element above the outer parts 7 is also increased in the rigidity. Therefore, the rigidity of the tread element as a whole is improved, and it becomes possible to increase the number r density of the sipes.

Studless tires of size 195/65R15 having the specifications shown in Table 1 were made and tested for on-the-snow performance, on-the-ice performance, and wear resistance.

(1) On-the-snow and on-the-ice Performance Test

A 2500cc FR passenger car provided on all the four wheels with test tires was run at a speed of 40 km/h on a snowy road (Snow cover: about 40 mm) and an icy road, and the braking distance was measured. (Air temperature: −5 degrees C.) The results are indicated in Table 1 by an index based on Ref.3 tire being 100. The larger the value, the better the breaking performance.

(2) Wear Resistance Test

The amount of tread wear was measured after running on dry asphalt roads for 8000 km. The results are also indicated in Table 1 by an index based on Ref.3 tire being 100. The larger the value, the higher the wear resistance.

TABLE 1

| Tire | Ex. 1 | Ex. 2 | Ex. 3 | Ref. 1 | Ref. 2 | Ref. 3 | Ref. 4 | Ref. 5 |
| --- | --- | --- | --- | --- | --- | --- | --- | --- |
| Sipe | | | | | | | | |
| Shape | FIG. 2 | FIG. 2 | FIG. 6 | straight | straight | straight | straight | straight |
| Number of Inner parts | 6 | 6 | 6 | 0 | 0 | 0 | 0 | 0 |
| Depth H0 (mm) | 8 | 8 | 8 | 4 | 4 | 8 | 8 | 8 |
| Height | | | | | | | | |
| H1 (% of H0) | 50 | 50 | 75 | 0 | 0 | 0 | 0 | 0 |
| H2 (% of H0) | | | 25 | | | | | |

TABLE 1-continued

| Tire | Ex. 1 | Ex. 2 | Ex. 3 | Ref. 1 | Ref. 2 | Ref. 3 | Ref. 4 | Ref. 5 |
|---|---|---|---|---|---|---|---|---|
| Gap P (mm) | 2.5 | 4 | 2.5 | 2.5 | 5 | 5 | 4 | 2.5 |
| Test results | | | | | | | | |
| On-the-Snow | | | | | | | | |
| 0% tread wear | 120 | 110 | 120 | 120 | 90 | 100 | 105 | 90 |
| 50% tread wear | 110 | 105 | 115 | 65 | 60 | 100 | 110 | 115 |
| On-the-ice | | | | | | | | |
| 0% tread wear | 130 | 115 | 135 | 130 | 90 | 100 | 105 | 90 |
| 50% tread wear | 115 | 105 | 120 | 55 | 50 | 100 | 110 | 120 |
| Wear resistance | 100 | 110 | 100 | 115 | 120 | 100 | 90 | 80 |

The height BH of the tread elements (=tread groove depth) was 10 mm. All the tread elements were a rectangular block having a circumferential length of 34 mm and an axial width of 24 mm.

What is claimed is:

1. A vehicle tire comprising a tread portion with a tread face, and sipes disposed in the tread portion,
    each of the sipes consisting of a radially outer part and radially inner parts,
    the radially outer part defined as extending radially inwards from the tread face to a certain depth H and extending continuously in the longitudinal direction of the sipe,
    said radially inner parts each extending radially inwards from the radially inner end of the radially outer part at said certain depth H,
    said radially inner parts being at least one first inner part and at least two second inner parts,
    said at least one first inner part each defined as inclined towards one side of the radially outer part (a) from the radially outer end thereof at said certain depth H to the radially inner end thereof or (b) from a position radially inwardly at a small distance from the radially outer end thereof to the radially inner end thereof and
    said at least two second inner parts each defined as inclined towards the other side of the radially outer part from the radially outer end thereof at said certain depth H to the radially inner end thereof,
    the first and second inner parts alternating with each other in the longitudinal direction, and gaps between the first and second inner parts in the longitudinal direction being at most 2 mm, wherein said at least one first inner part of one of said sipes overlaps said at least two second inner parts of an adjacent sipe when viewing a cross-section of the tread portion.

2. The vehicle tire according to claim 1, wherein a radial height H1 of the inner parts is 0.2 to 0.8 times the depth H0 of the sipe.

3. The vehicle tire according to claim 2, wherein the inclination angle of each said radially inner part with respect to a direction normal to the tread face gradually decreases radially inwards.

4. The vehicle tire according to claim 1, wherein the inclination angle of each said radially inner part with respect to a direction normal to the tread face gradually decreases radially inwards.

5. The vehicle tire according to claim 4, wherein the inclination angle is substantially 0 degrees at the bottom of the sipe.

6. The vehicle tire according to claim 1, wherein the sipes are inclined at an angle from 5 to 30 degrees with respect to the axial direction of the tire in said tread face.

7. The vehicle tire according to claim 1, wherein the sipes are inclined at substantially 0 degrees with respect to the axial direction of the tire in said tread face.

8. The vehicle tire according to claim 1, wherein a depth H0 of each said sipe is 0.4 to 1.0 times a radial height BH of a tread element in which the sipe is formed.

9. The vehicle tire according to claim 1, wherein the sipes include sipes which are arranged in parallel with each other at intervals of not more than 8 mm.

10. The vehicle tire according to claim 1, wherein the sipes include sipes which are arranged in parallel with each other at intervals of not more than 4 mm.

11. The vehicle tire according to claim 1, wherein the sipes include sipes which are arranged in parallel with each other at intervals of not more than 3 mm.

12. The vehicle tire according to claim 1, wherein each of the first and second inner parts has a substantially constant length throughout its depth, and
    a total length of the first inner parts is substantially equal to a total length of the second inner parts.

13. The vehicle tire according to claim 1, wherein with respect to a configuration in a plane parallel with the tread face, each of the first and second inner parts is parallel with the longitudinal direction throughout its depth.

14. A vehicle tire comprising a tread portion with a tread face, and sipes disposed in the tread portion,
    each of the sipes consisting of a radially outer part and radially inner parts,
    the radially outer part defined as extending radially inwards from the tread face to a certain depth H and extending continuously in the longitudinal direction of the sipe,
    said radially inner parts each extending radially inwards from the radially inner end of the radially outer part at said certain depth H,
    said radially inner parts being at least one first inner part and at least two second inner parts,
    said at least one first inner part each defined as inclined at a first inclination angle towards one side of the radially outer part from a position radially inwardly at a small distance from the radially outer end thereof to the radially inner end thereof and
    said at least two second inner parts each defined as inclined at a second inclination angle towards the other side of the radially outer part from the radially outer end thereof at said certain depth H to the radially inner end thereof,
    the first and second inner parts alternating with each other in the longitudinal direction, and gaps between the first and second inner parts in the longitudinal direction being at most 2 mm, wherein said first and second inclination angles (alpha) are acute angles with respect to a center line (X) of the sipe and gradually decrease radially inwards to substantially 0 degrees at the bottom.

15. A vehicle tire according to claim 14, wherein each of the first and second inner parts has a substantially constant length throughout its depth, the number of the first parts is different from the number of the second parts, and a total length of the first inner parts is substantially equal to a total length of the second inner parts.

\* \* \* \* \*